United States Patent [19]

Harrison et al.

[11] Patent Number: 4,962,081

[45] Date of Patent: Oct. 9, 1990

[54] COLOR FILTER ARRAY ELEMENT WITH POLYCARBONATE RECEIVING LAYER

[75] Inventors: Daniel J. Harrison, Rochester; Helmut Weber, Webster; Paul D. Yacobucci, Rochester, all of N.Y.

[73] Assignee: Eastman Kodak Company, Rochester, N.Y.

[21] Appl. No.: 334,269

[22] Filed: Apr. 6, 1989

[51] Int. Cl.$^5$ ....................... B41M 5/035; B41M 5/26
[52] U.S. Cl. ......................................... 503/227; 8/471; 350/311; 428/195; 428/412; 428/913; 428/914; 430/7; 430/200; 430/201; 430/945

[58] Field of Search ................... 8/471; 428/195, 913, 428/194, 412; 503/227; 350/311; 430/7, 200, 201, 945

[56] References Cited

U.S. PATENT DOCUMENTS 4,695,286 9/1987 Vanier et al. ........................ 8/471
4,776,671 10/1988 Sumi et al. ....................... 350/311

Primary Examiner—Bruce H. Hess
Attorney, Agent, or Firm—Harold E. Cole

[57] ABSTRACT

A thermally-transferred color filter array element comprising a transparent support having thereon a thermally-transferred image comprising a repeating mosaic pattern of colorants in a polycarbonate binder having a $T_g$ greater than about 200° C.

20 Claims, No Drawings

COLOR FILTER ARRAY ELEMENT WITH POLYCARBONATE RECEIVING LAYER

This invention relates to a particular polycarbonate receiving layer for a thermally-transferred color filter array element which is used in various applications such as a liquid crystal display device.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye donor element is placed face to face with a dye receiving element. The two are then inserted between a thermal printing head and a platen roller. A line type thermal printing head is used to apply heat from the back of the dye donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nov. 4, 1986, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB No. 2,083,726A, the disclosure of which is hereby incorporated by reference.

Liquid crystal display devices are known for digital display in electronic calculators, clocks, household appliances, audio equipment, etc. There has been a need to incorporate a color display capability into such monochrome display devices, particularly in such applications as peripheral terminals using various kinds of equipment involving phototube display, mounted electronic display, or TV image display. Various attempts have been made to incorporate a color display using a color filter array into these devices. However, none of the color array systems for liquid crystal display devices so far proposed have been successful in meeting all the users needs.

One commercially-available type of color filter array which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. This method contains many labor intensive steps, requires careful alignment, is time-consuming and very costly.

In addition, a color filter array to be used in a liquid crystal display device may have to undergo rather severe heating and treatment steps during manufacture. For example, a transparent electrode layer, such as indium tin oxide, is usually vacuum sputtered onto the color filter array. This may take place at elevated temperatures such as 200° C. for up to one hour. This is followed by coating with an alignment layer for the liquid crystals, such as a polyimide, which needs to be cured for several hours at an elevated temperature. These treatment steps can be very harmful to many color filter arrays, especially those with a gelatin matrix.

In U.S. Ser. No. 259,080, filed Oct. 18, 1988 of DeBoer entitled "Color Filter Array Element Obtained by Laser induced Thermal Dye Transfer", color filter array elements obtained by using a laser are described. Various materials are described therein for use as the binder for the image-receiving layer including polycarbonates such as General Electric Lexan ® Polycarbonate Resin #ML-4735, ($T_g$ 160° C.); Lexan ®101 ($T_g$ 150° C.); and Bayer AG Makrolon #5705 ®($T_g$ 160° C.). A problem has developed with the use of these materials in that the transferred image tends to diffuse laterally in the binder causing image smear, especially upon incubation at elevated temperatures.

It would be desirable to provide a color filter array element having high quality, good sharpness and which could be obtained easily and at a lower price than those of the prior art. It would also be desirable to provide such a color filter array element having a binder which would have less lateral image displacement or image smear than those described above, especially upon incubation.

These and other objects are achieved in accordance with this invention which comprises a thermally-transferred color filter array element comprising a transparent support having thereon a thermally-transferred image comprising a repeating mosaic pattern of colorants in a polycarbonate binder having a $T_g$ greater than about 200° C.

In general, polycarbonates with a $T_g$ greater than about 200° C. which are useful in the invention have a large bulky central moiety On the bridging carbon atom or on the phenol. In a preferred embodiment of the invention the polycarbonate is derived from a bisphenol component comprising a diphenyl methane moiety. Polycarbonates useful in the invention include the following:

Polycarbonate 1

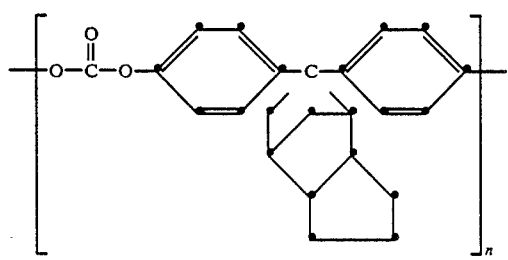

Tg = 260° C.
m.w. ≈ 100,000
n ≈ 250
A polycarbonate derived from 4,4'-(hexahydro-4,7-methanoindene-5-ylidene)bisphenol Polycarbonate 2

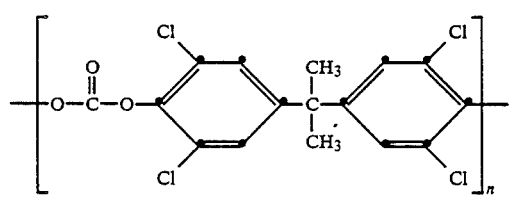

Tg = 220° C.
m.w. ≈ 100,000
n ≈ 250
A polycarbonate derived from 2,2',6,6'-tetrachloro-bisphenol-A Polycarbonate 3

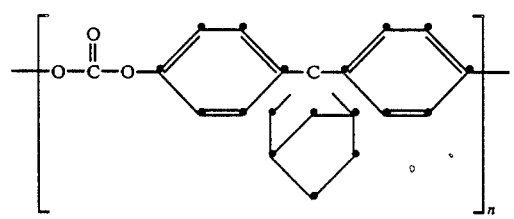

Tg = 224° C.
m.w. ≈ 100,000
n ≈ 250
A polycarbonate derived from 4,4'-(2-norbornylidene)bisphenol Polycarbonate 4

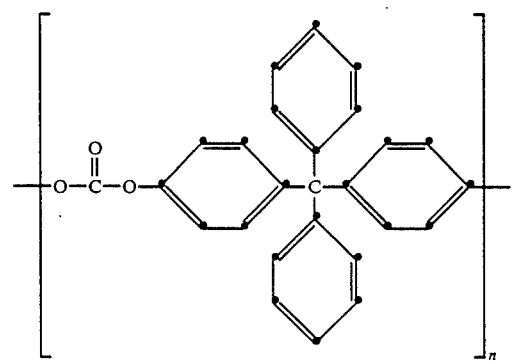

m.w. ≈ 100,000
n ≈ 250
A polycarbonate derived from bis(4-hydroxyphenyl)-diphenylmethane Polycarbonate 5

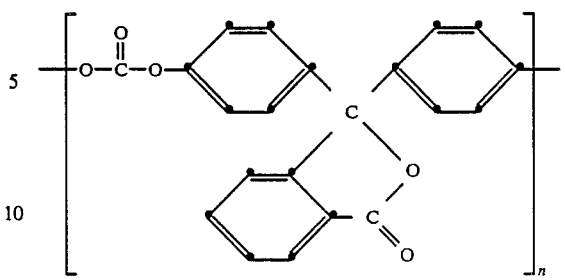

m.w. ≈ 100,000
n ≈ 250
A polycarbonate derived from phenolphthalein

Polycarbonate 6

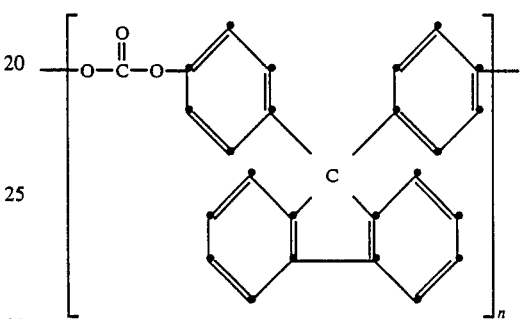

m.w. ≈ 100,000
n ≈ 250
A polycarbonate derived from 9,9-bis(4-hydroxyphenyl)-fluorene In a preferred embodiment of the invention, the mosaic pattern which is obtained by the thermal transfer process consists of a set of red, green and blue additive primaries.

In another preferred embodiment of the invention, each primary color and each set of primary colors are separated from each other by an opaque area, e.g., black grid lines. This has been found to give improved color reproduction and reduce flare in the displayed image.

The size of the mosaic set is normally not critical since it depends on the viewing distance. In general, the individual pixels of the set are from about 50 to about 300 μm. They do not have to be of the same size.

As noted above, the color filter array elements of the invention are used in various display devices such as a liquid crystal display device. Such liquid crystal display devices are described, for example, in UK Patent Nos. 2,154,355; 2,130,781; 2,162,674 and 2,161,971.

A process of forming a color filter array element according to the invention comprises
(a) imagewise-heating a dye-donor element comprising a support having there on a dye layer, and
(b) transferring a dye layer to a dye-receiving element comprising a transparent support having thereon a polycarbonate binder having a $T_g$ greater than about 200° C. as described above,
the imagewise-heating being done in such a way as to produce a repeating mosaic pattern of colorants to form the color filter array element.

Various methods can be used to transfer dye from the dye donor to the transparent support to form the color filter array of the invention. There may be used, for example, a high intensity light flash technique with a dye donor containing an energy absorptive material such as carbon black. This method is described more fully in U.K. Application No. 8824366.2 by Simons filed Oct. 18, 1988, the disclosure of which is hereby incorporated by reference.

Another method of transferring dye from the dye-donor to the transparent support to form the color filter array of the invention is to use a heated embossed roller as described more fully in U.K. Application No. 8824365.4 by Simons filed Oct. 18, 1988, the disclosure of which is hereby incorporated by reference.

In a preferred embodiment of the invention, a laser is used to transfer dye from the dye-donor to the receiver as described more fully in U.S. Ser. No. 259,080, filed Oct. 18, 1988 of DeBoer entitled "Color Filter Array Element Obtained by Laser-induced Thermal Dye Transfer", the disclosure of which is hereby incorporated by reference.

A dye-donor element that is used to form the color filter array element of the invention comprises a support having thereon a dye layer. Any imaging dye can be used in such a layer provided it is transferable to the dye image-receiving layer of the color array element of the invention by the action of heat. Especially good results have been obtained with sublimable dyes. Examples of sublimable dyes include anthraquinone dyes, e.g., Sumikalon Violet RS ® (product of Sumitomo Chemical Co., Ltd.), Dianix Fast Violet 3R-FS ® (product of Mitsubishi Chemical Industries, Ltd.), and Kayalon Polyol Brilliant Blue N-BGM ® and KST Black 146 ® (products of Nippon Kayaku Co., Ltd.); azo dyes such as Kayalon Polyol Brilliant Blue BM ®, Kayalon Polyol Dark Blue 2BM ®, and KST Black KR ® (products of Nippon Kayaku Co., Ltd.), Sumickaron Diazo Black 5G ® (product of Sumitomo Chemical Co., Ltd.), and Miktazol Black 5GH ® (product of Mitsui Toatsu Chemicals, Inc.); direct dyes such as Direct Dark Green B ® (product of Mitsubishi Chemical Industries, Ltd.) and Direct Brown M ® and Direct Fast Black D ® (products of Nippon Kayaku Co. Ltd.); acid dyes such as Kayanol Milling Cyanine 5R ® (product of Nippon Kayaku Co. Ltd.); basic dyes such as Sumicacryl Blue 6G ® (product of Sumitomo Chemical Co., Ltd.), and Aizen Malachite Green ® (product of Hodogaya Chemical Co., Ltd.);

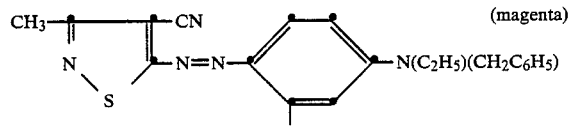
(magenta)

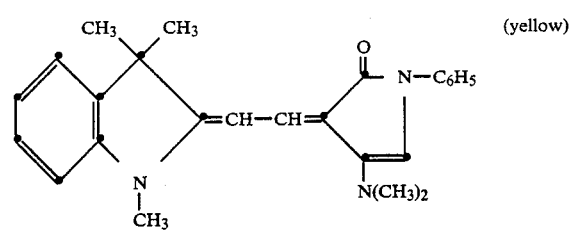
(yellow)

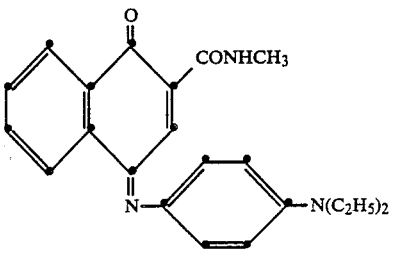
(cyan)

or any of the dyes disclosed in U.S Pat. No. 4,541,830. The above cyan, magenta, and yellow subtractive dyes may be employed in various combinations, either in the dye-donor itself or by being sequentially transferred to the dye image-receiving element, to obtain the desired red, blue and green additive primary colors to produce a white viewing neutral or any other combinations as desired. Red, green and blue additive dyes may also be used in the dye-donor for transfer to the image receiving element. The dyes may be used at a coverage of from about 0.05 to about 1 g/m² and are preferably hydrophobic.

If a laser is used to transfer dye from the dye-donor to the receiver, then an absorptive material is used in the dye-donor. Any material that absorbs the laser energy may be used such as carbon black or non-volatile infrared-absorbing dyes or pigments which are well known to those skilled in the art. Cyanine infrared absorbing dyes may also be employed with infrared diode lasers as described in DeBoer Application Ser. No. 221,163 filed July 19, 1988, the disclosure of which is hereby incorporated by references.

In a preferred embodiment of the invention, a process of forming a laser-induced color filter array element is provided comprising
(a) imagewise-heating by means of a laser a dye-donor element comprising a support having thereon a dye layer and an absorbing material for the laser, and
(b) transferring a dye image to a dye-receiving element comprising a transparent support having thereon a dye image receiving layer to form the laser-induced color filter array element, the imagewise-heating being done in such a way as to produce a repeating mosaic pattern of colorants.

The imaging dye, and an infrared-absorbing material if one is present, are dispersed in the dye-donor element in a polymeric binder such as a cellulose derivative, e.g., cellulose acetate hydrogen phthalate, cellulose acetate, cellulose acetate propionate, cellulose acetate butyrate, cellulose triacetate; a polycarbonate; poly(styrene-co-acrylonitrile), a poly(sulfone) or a poly(phenylene oxide). The binder may be used at a coverage of from about 0.1 to about 5 g/m².

The dye layer of the dye-donor element may be coated on the support or printed thereon by a printing technique such as a gravure process.

Any material can be used as the support for the dye-donor element provided it is dimensionally stable and can withstand the heat generated by the thermal transfer device such as a laser beam. Such materials include polyesters such as poly(ethylene terephthalate); polyamides; polycarbonates; glassine paper; condenser paper; cellulose esters; fluorine polymers; polyethers; polyacetals; polyolefins; and polyimides. The support generally has a thickness of from about 2 to about 250

μm. It may also be coated with a subbing layer, if desired.

The dye-donor element of the invention may be used in sheet form or in a continuous roll or ribbon. If a continuous roll or ribbon is employed, it may have only one dye or may have alternating areas of other different dyes, such as sublimable cyan and/or magenta and/or yellow and/or black or other dyes. Such dyes are disclosed in U.S. Pat. Nos. 4,541,830, 4,698,651, 4,695,287, 4,701,439, 4,757,046, 4,743,582, 4,769,360 or 4,753,922, the disclosures of which are hereby incorporated by reference.

The support for the dye image-receiving element or color filter array element of the invention may be any transparent material such as polycarbonate, poly(ethylene terephthalate), cellulose acetate, polystyrene, etc. In a preferred embodiment, the support is glass.

After the dyes are transferred to the receiver, the image may be thermally fused to stabilize the image. This may be done by radiant heating, solvent vapor, or by contact with heated rollers. The fusing step aids in preventing fading and surface abrasion of the image upon exposure to light and also tends to prevent crystallization of the dyes. Solvent vapor fusing may also be used instead of thermal fusing.

Several different kinds of lasers could conceivably be used to effect the thermal transfer of dye from a donor sheet to the dye-receiving element to form the color filter array element in a preferred embodiment of the invention, such as ion gas lasers like argon and krypton; metal vapor lasers such as copper, gold, and cadmium; solid state lasers such as ruby or YAG; or diode lasers such as gallium arsenide emitting in the infrared region from 750 to 870 nm. However, in practice, the diode lasers offer substantial advantages in terms of their small size, low cost, stability, reliability, ruggedness, and ease of modulation. In practice, before any laser can be used to heat a dye-donor element, the laser radiation must be absorbed into the dye layer and converted to heat by a molecular process known as internal conversion. Thus, the construction of a useful dye layer will depend not only on the hue, sublimability and intensity of the image dye, but also on the ability of the dye layer to absorb the radiation and convert it to heat.

Lasers which can be used to transfer dye from the dye-donor element to the dye-image receiving element to form the color filter array element in a preferred embodiment of the invention are available commercially. There can be employed, for example, Model SDL-2420-H2 ® from Spectrodiode Labs, or Laser Model SLD 304 V/W ® from Sony Corp.

The following examples are provided to illustrate the invention.

EXAMPLE 1

Preparation of Polycarbonate 1

A 500-mL three-necked flask equipped with a stirrer, a thermometer, a wide-bore gas inlet tube, and a gas outlet was charged with 4,4'-(hexahydro4,7 methanoindene 5-ylidene)bisphenol (32.0 g, 0.1 mole), pyridine (32 g), and methylene chloride (250 mL). Gaseous phosgene was passed into the rapidly stirred reaction mixture, which was maintained at 25°-30° C. with a water bath. Pyridine hydrochloride began to separate from the reaction mixture after about 25 minutes. Approximately 15 minutes later a marked increase in viscosity was noted over a period of 2-3 minutes; the polymerization was then essentially completed. The flask was then vented with nitrogen to a phosgene trap, and water (700 mL) and methylene chloride (100 mL) were added immediately. The mixture was stirred 1 hour then neutralized with dilute hydrochloric acid (2% 200 mL) followed by water (5×200 mL). The polymer solution was vigorously stirred and precipitated as soft particles by adding acetone 500 mL. The particles were hardened with methanol (1L), filtered, washed with methanol, then water, and vacuum dried at 70° C. The polymer yield was 67%, with a Tg of 260° C.

EXAMPLE 2

A magenta dye-donor was prepared by coating on an unsubbed 100 μm poly(ethylene terephthalate) support a dye layer containing the magenta dye illustrated above (0.38 g/m$^2$) in a cellulose acetate propionate (2.5% acetyl, 45% propionyl) binder (0.27 g/m$^2$) coated from a butanone and cyclohexanone solvent mixture. The dye layer also contained the following cyanine infrared absorbing dye (0.14 g/m$^2$):

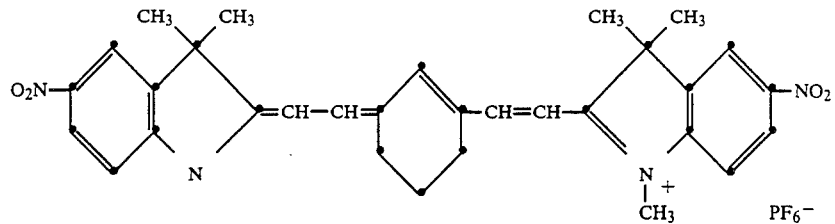

To this dried layer, an overcoat of polystyrene beads (av. diameter 8 μm) (0.02 g/m$^2$) was coated from an aqueous solution.

A dye-receiver was prepared by coating a subbing layer of poly(acrylonitrile-co-vinylidene chloride-co-acrylic acid) (14:79:7 wt ratio) (0.08 g/m$^2$) on a 175 μm thick poly(ethylene terephthalate) support. On top of this layer, the polycarbonate in Table 1 (2.9 g/m$^2$) and DC-510 ® Silicone Fluid (Dow Corning) (0.01 g/m$^2$) were coated from a methylene chloride and trichloroethylene solvent mixture.

The dye-receiver was overlaid with the dye-donor placed on a drum and taped with just sufficient tension to be able to see the deformation of the surface beads. The assembly was then scanned on the 180 rpm rotating drum to a focused 830 nm laser beam from a Spectrodiode Labs Laser Model SDL-24200 -H2 using a 50 μm spot diameter and exposure time of 5 millisec to transfer the areas of dye to the receiver. The power was 86 milliwatts and the exposure energy was 44 microwatts/square micron. A series of parallel lines consisting of 30

μm wide imaged dye lines each alternating with either 50, 100 or 150 μm width zero density non imaged spacings was generated.

Each formed image was treated with a stream of air saturated with methylene chloride vapors at 22° C. for about 5 min to cause the dye to penetrate into the receiver.

Each series of imaged magenta dye lines was then examined under a microscope at 50X after transfer and found to be easily distinguishable from the clear, zero density, non-imaged area spacings. Each imaged receiver was then incubated in an oven at 200° C. for one hour and then reexamined to determine the extent of lateral dye diffusion or image smear. The following categories were established:

None: After incubation, all three sets of 30 μm wide parallel image lines separated with spacings of 50, 100, or 150 μm were easily discernable from the non-imaged separating areas. There was no dye diffusion to the non-imaged area.

Slight: After incubation, all imaged lines were discernable. However, some dye was visible in the non-imaged areas within the 50 μm wide spacings.

Severe: After incubation, all imaged lines were discernable. However, substantial dye was visible in the non-imaged areas within the 50 and 100 μm wide spacings.

The initial transferred maximum dye densities of all invention receiver polymers were above 1.2.

The following results were obtained.

TABLE 1

| Receiver Polymer | | Smear |
| --- | --- | --- |
| Bisphenol-A derivative | (Control 1) | Severe |
| Styrene-acrylonitrile | (Control 2) | Severe |
| Styrene-acrylonitrile | (Control 3) | Severe |
| Vinylidene chloride-acrylonitrile | (Control 4) | Severe |
| Polycarbonate 1 | | None |
| Polycarbonate 2 | | None |
| Polycarbonate 3 | | Slight |

(Control 1) Bayer AG Makrolon 5705 ® bisphenol-A polycarbonate
(Control 2) Poly(styrene-co-acrylonitrile) (60:40 wt ratio)
(Control 3) Poly(styrene-co-acrylonitrile) (70:30 wt ratio)
(Control 4) Poly(vinylidene chloride-co-acrylic acid) (80:20 wt ratio)

The above data show that the polymers of the invention are effective dye-receiving layers yet do not cause image smear upon high temperature incubation, in comparison to several typical image-receiving layers used in thermal dye transfer systems of the prior art.

The invention has been described in detail with particular reference to preferred embodiments thereof, but it will be understood that variations and modifications can be effected within the spirit and scope of the invention.

What is claimed is:

1. A thermally-transferred color filter array element comprising a transparent support having thereon a thermally-transferred image comprising a repeating mosaic pattern of colorants in a polycarbonate binder having a $T_g$ greater than about 200° C.

2. The element of claim 1 wherein said polycarbonate is derived from a bisphenol component comprising a diphenyl methane moiety.

3. The element of claim 1 wherein said polycarbonate is derived from 4,4'-(hexahydro-4,7-methanoindene-5-ylidene)bisphenol.

4. The element of claim 1 wherein said polycarbonate is derived from 2,2',6,6'-tetrachlorobisphenol-A.

5. The element of claim 1 wherein said polycarbonate is derived from 4,4'-(2-norbornylidene)bisphenol.

6. The element of claim 1 wherein said thermally-transferred image comprises one or more sublimable dyes.

7. The element of claim 1 wherein said pattern consists of a set of red, green and blue additive primaries.

8. The element of claim 7 wherein each said primary color and each said set of primary colors are separated from each other by an opaque area.

9. The element of claim 1 wherein said thermally-transferred image is laser induced.

10. The element of claim 1 wherein said thermally transferred image is obtained using a high intensity light flash.

11. The element of claim 1 wherein said support is glass.

12. A process of forming a color filter array element comprising
    (a) imagewise-heating a dye donor element comprising a support having thereon a dye layer, and
    (b) transferring a dye layer to a dye-receiving element comprising a transparent support having thereon a polycarbonate binder having a $T_g$ greater than about 200° C.,
said imagewise-heating being done in such a way as to produce a repeating mosaic pattern of colorants to form said color filter array element.

13. The process of claim 12 wherein said polycarbonate is derived from a bisphenol component comprising a diphenyl methane moiety.

14. The process of claim 12 wherein said polycarbonate is derived from 4,4'-(hexahydro-4,7-methanoindene-5-ylidene)bisphenol.

15. The process of claim 12 wherein said polycarbonate is derived from 2,2',6,6'-tetrachlorobisphenol-A.

16. The process of claim 12 wherein said polycarbonate is derived from 4,4'-(2-norbornylidene)bisphenol.

17. The process of claim 16 wherein said dye donor element contains a light-absorbing material.

18. The process of claim 17 wherein a laser is used to perform said imagewise-heating step.

19. The process of claim 17 wherein a high intensity light flash is used to perform said imagewise-heating step.

20. The process of claim 16 which includes a further step of heating the transferred image or subjecting it to solvent vapor to stabilize the image.

* * * * *